United States Patent
Semenov et al.

(10) Patent No.: US 9,325,218 B2
(45) Date of Patent: Apr. 26, 2016

(54) LAMINATED ROTOR BALANCING PROVISIONS

(75) Inventors: Dmitry Yurevich Semenov, Moscow (RU); Anthony Salvatore Arrao, Clifton Park, NY (US); Mikhail Avramovich Avanesov, Moscow (RU); Richard Nils Dawson, Voorheesville, NY (US); Evgeny Victorovich Kazmin, Moscow (RU); Timothy Gerald Schmehl, Clifton Park, NY (US); Yury Danilovich Vinitsky, Moscow (RU)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 13/822,767

(22) PCT Filed: Jul. 6, 2011

(86) PCT No.: PCT/RU2011/000491
§ 371 (c)(1),
(2), (4) Date: Mar. 13, 2013

(87) PCT Pub. No.: WO2013/006078
PCT Pub. Date: Jan. 10, 2013

(65) Prior Publication Data
US 2014/0103754 A1    Apr. 17, 2014

(51) Int. Cl.
*H02K 3/487*     (2006.01)
*H02K 7/04*      (2006.01)
(Continued)

(52) U.S. Cl.
CPC .. *H02K 7/04* (2013.01); *H02K 3/28* (2013.01); *H02K 3/487* (2013.01); *H02K 15/04* (2013.01)

(58) Field of Classification Search
CPC ............................. H02K 15/165; H02K 7/04
USPC .................................................. 310/51, 214
See application file for complete search history.

(56) References Cited

U.S. PATENT DOCUMENTS

| 383,659 A | 5/1888 | Schmid et al. |
|---|---|---|
| 464,026 A | 12/1891 | Kammeyer |

(Continued)

FOREIGN PATENT DOCUMENTS

| DE | 2815214 A1 | 10/1979 |
|---|---|---|
| DE | 3013704 A1 | 10/1981 |

(Continued)

OTHER PUBLICATIONS

Office Action for EP Application No. 11815734.6 dated Jun. 24, 2015, 5 pages.

(Continued)

*Primary Examiner* — Burton Mullins
(74) *Attorney, Agent, or Firm* — Ernest G. Cusick; Hoffman Warnick LLC

(57) ABSTRACT

A laminated rotor and an electric machine including the laminated rotor are disclosed. In an embodiment, a rotor comprises a plurality of stacked laminations, wherein each lamination includes a plurality of radially extending slots arranged about a circumference of each of the plurality of laminations, and the plurality of radially extending slots in successive laminations in the stack are aligned. A stud member passes longitudinally through at least one hole in the lamination stack, and a plurality of coils are positioned within the plurality of slots. Fewer than all of the plurality of slots have a coil positioned therein, leaving at least three slots empty. Balance members may be placed in the slots that do not have a coil positioned therein to balance the rotor.

19 Claims, 6 Drawing Sheets

(51) Int. Cl.
*H02K 3/28* (2006.01)
*H02K 15/04* (2006.01)

(56) References Cited

U.S. PATENT DOCUMENTS

| | | | |
|---|---|---|---|
| 780,085 A | 1/1905 | Behrend et al. | |
| 932,083 A | 8/1909 | Wouters | |
| 1,028,985 A | 6/1912 | Behrend | |
| 2,064,033 A | 12/1936 | Rose | |
| 3,119,033 A | 1/1964 | Horsley et al. | |
| 3,763,386 A | 10/1973 | Anderson, Jr. | |
| 3,783,317 A | 1/1974 | Sisk | |
| 3,965,382 A | 6/1976 | McCrosky et al. | |
| 4,121,926 A | 10/1978 | Ogawa et al. | |
| 4,152,610 A | 5/1979 | Wallenstein | |
| 4,259,603 A | 3/1981 | Uchiyama et al. | |
| 4,298,812 A | 11/1981 | Damiron et al. | |
| 4,315,301 A | 2/1982 | Jimena | |
| 4,363,986 A | 12/1982 | Joho et al. | |
| 4,489,249 A | 12/1984 | Olivier | |
| 4,503,377 A | 3/1985 | Kitabayashi et al. | |
| 4,614,888 A | 9/1986 | Mosher et al. | |
| 4,642,886 A | 2/1987 | Muck et al. | |
| 4,761,580 A | 8/1988 | Hein et al. | |
| 4,922,147 A | 5/1990 | Sismour, Jr. et al. | |
| 5,030,871 A | 7/1991 | Shah et al. | |
| 5,174,011 A | 12/1992 | Weigelt | |
| 5,495,133 A | 2/1996 | Bawin et al. | |
| 5,559,419 A | 9/1996 | Jansen et al. | |
| 5,685,063 A | 11/1997 | Prole et al. | |
| 5,742,515 A | 4/1998 | Runkle et al. | |
| 5,886,443 A | 3/1999 | Dymond et al. | |
| 5,892,306 A | 4/1999 | Lloyd | |
| 5,894,183 A | 4/1999 | Borchert | |
| 6,082,186 A | 7/2000 | Detwiler | |
| 6,177,750 B1 | 1/2001 | Tompkin | |
| 6,265,805 B1 | 7/2001 | Debleser | |
| 6,459,180 B1 | 10/2002 | Mori et al. | |
| 6,628,005 B2 | 9/2003 | Nelson et al. | |
| 6,710,497 B2 | 3/2004 | Wang et al. | |
| 6,734,585 B2 | 5/2004 | Tornquist et al. | |
| 6,774,522 B2 | 8/2004 | Aoyama et al. | |
| 7,275,442 B2 | 10/2007 | Bentzel | |
| 7,531,934 B2 | 5/2009 | Hang et al. | |
| 7,562,542 B2 | 7/2009 | Choi | |
| 7,626,309 B2 | 12/2009 | Watson | |
| 7,692,352 B2 | 4/2010 | Sirois | |
| 2002/0057027 A1 | 5/2002 | McLaren et al. | |
| 2003/0094872 A1 | 5/2003 | Tornquist et al. | |
| 2003/0102762 A1 | 6/2003 | Jansen et al. | |
| 2003/0201646 A1 | 10/2003 | Kaploun | |
| 2004/0164627 A1 | 8/2004 | Tornquist et al. | |
| 2005/0126230 A1 | 6/2005 | Choi | |
| 2006/0214645 A1 | 9/2006 | Rufer et al. | |
| 2006/0267441 A1 | 11/2006 | Hang et al. | |
| 2009/0123282 A1* | 5/2009 | Buskirk et al. ............ 416/1 | |
| 2010/0281688 A1 | 11/2010 | Keller et al. | |
| 2011/0080068 A1 | 4/2011 | Dawson et al. | |

FOREIGN PATENT DOCUMENTS

| | | | | |
|---|---|---|---|---|
| EP | 0320304 | A1 | 6/1989 | |
| EP | 0461733 | A2 | 12/1991 | |
| EP | 0484026 | A2 | 5/1992 | |
| EP | 0538472 | A1 | 4/1993 | |
| EP | 0484026 | A3 | 10/1993 | |
| EP | 0565312 | A2 | 10/1993 | |
| EP | 0577843 | A1 | 1/1994 | |
| EP | 0595609 | A1 | 5/1994 | |
| EP | 0632566 | A1 | 1/1995 | |
| EP | 0646937 | A1 | 4/1995 | |
| EP | 0657984 | A1 | 6/1995 | |
| EP | 0658895 | A2 | 6/1995 | |
| EP | 0565312 | A3 | 12/1995 | |
| EP | 0712198 | A1 | 5/1996 | |
| EP | 0728956 | A1 | 8/1996 | |
| EP | 0658895 | A3 | 6/1997 | |
| EP | 0538472 | B1 | 10/1997 | |
| EP | 0823771 | A1 | 2/1998 | |
| EP | 0577843 | B1 | 3/1998 | |
| EP | 0872944 | A1 | 10/1998 | |
| EP | 0622885 | B1 | 9/2000 | |
| EP | 1541739 | A2 | 6/2005 | |
| EP | 1796247 | A2 | 6/2007 | |
| EP | 1906509 | A2 | 4/2008 | |
| EP | 0872944 | B1 | 5/2008 | |
| EP | 1947758 | A2 | 7/2008 | |
| EP | 1962326 | A1 | 8/2008 | |
| EP | 1998425 | A2 | 12/2008 | |
| EP | 2083503 | A2 | 7/2009 | |
| EP | 2096735 | A1 | 9/2009 | |
| EP | 2099115 | A2 | 9/2009 | |
| EP | 2113987 | A1 | 11/2009 | |
| GB | 381641 | A | 10/1932 | |
| JP | 55034857 | A2 | 3/1980 | |
| JP | 56046652 | * | 4/1981 | ............ H02K 19/28 |
| JP | 57000054 | A2 | 1/1982 | |
| JP | 57046661 | * | 3/1982 | ............ H02K 19/28 |
| JP | 57046661 | A | 3/1982 | |
| JP | 57091656 | A | 6/1982 | |
| JP | 58051759 | A2 | 3/1983 | |
| JP | 60005764 | A2 | 1/1985 | |
| JP | 60035946 | A2 | 2/1985 | |
| JP | 60077646 | A2 | 5/1985 | |
| JP | 2188157 | A2 | 7/1990 | |
| JP | 4021338 | A2 | 1/1992 | |
| JP | 4178132 | A2 | 6/1992 | |
| JP | 5252679 | A2 | 9/1993 | |
| JP | 10290556 | A2 | 10/1998 | |
| JP | 2004140966 | A | 5/2004 | |
| JP | 2004343919 | A2 | 12/2004 | |
| JP | 2005229767 | | 8/2005 | |
| JP | 2006288061 | A2 | 10/2006 | |
| JP | 2010130842 | A | 6/2010 | |
| JP | 2010148294 | A2 | 7/2010 | |
| WO | 850938 | A1 | 2/1985 | |
| WO | 2004079882 | A1 | 9/2004 | |
| WO | 2013006079 | A1 | 1/2013 | |
| WO | 2013112067 | A1 | 8/2013 | |

OTHER PUBLICATIONS

Tamai, Office Action Communication for U.S. Appl. No. 12/574,448 dated Aug. 12, 2011, 20 pages.
Tamai, Office Action Communication for U.S. Appl. No. 12/574,448 dated Dec. 23, 2011, 20 pages.
GB Intellectual Property Office, Search Report Under Section 17(5) for GB1016526.4 dated Feb. 1, 2011, 5 pages.
Patent Cooperation Treaty, International Search Report for PCT/RU2011/000492 dated Jul. 17, 2012, 4 pages.
Patent Cooperation Treaty, International Search Report for PCT/RU2011/000491 dated Jul. 2, 2012, 3 pages.
Machine Translation of JP 2005-229767, Kazuhisa Takashima, "Rotating Electric Machine," Aug. 25, 2005.
Office Action issued in connection with corresponding RU Application No. 2013158011 on Sep. 2, 2014.
U.S. Appl. No. 13/823,054, Notice of Allowance dated Jul. 17, 2015, 14 pgs.
Office Action for U.S. Appl. No. 13/823,369, dated Apr. 15, 2015, 29 pages.
Office Action for U.S. Appl. No. 13/823,054, dated Apr. 7, 2015, 37 pages.
International Search Report and Written Opinion for PCT/RU2012/00034, mailed Feb. 8, 2013, 20 pages.
International Preliminary Report on Patentability for PCT/RU2014/00034, dated Jul. 29, 2014, 16 pages.

* cited by examiner

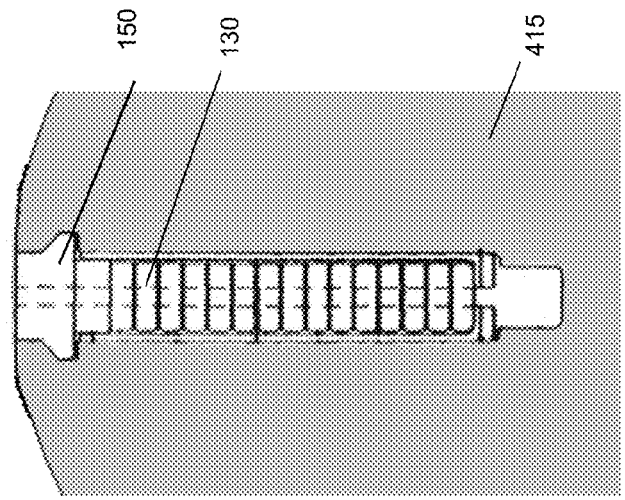
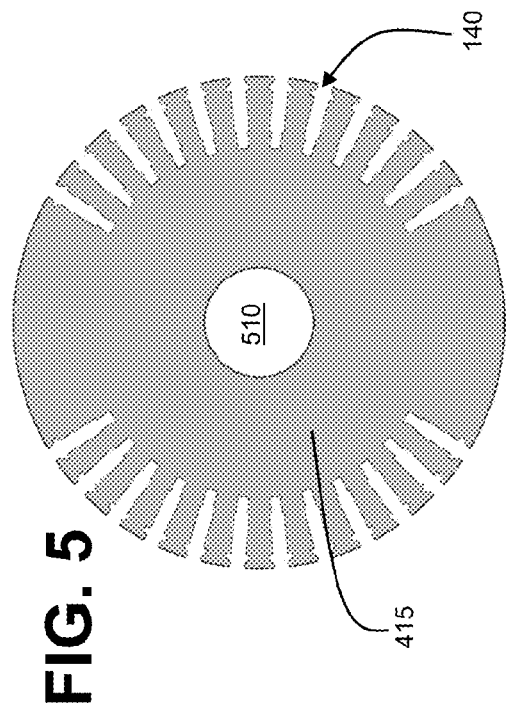
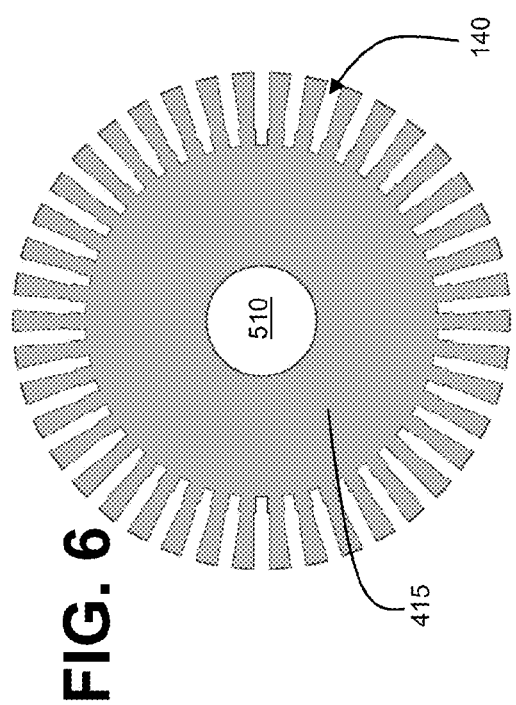

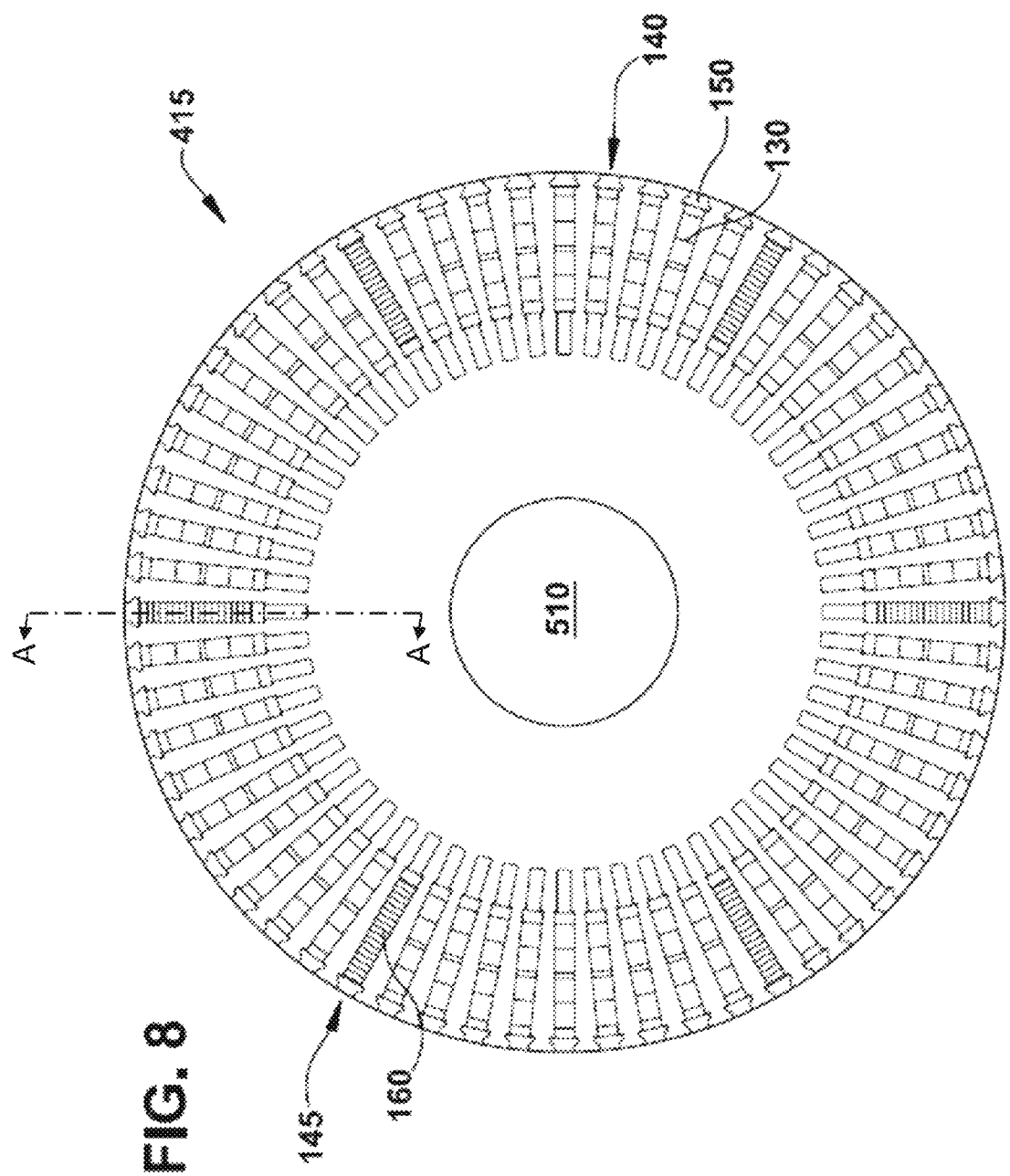

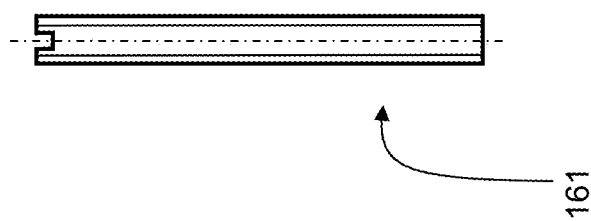
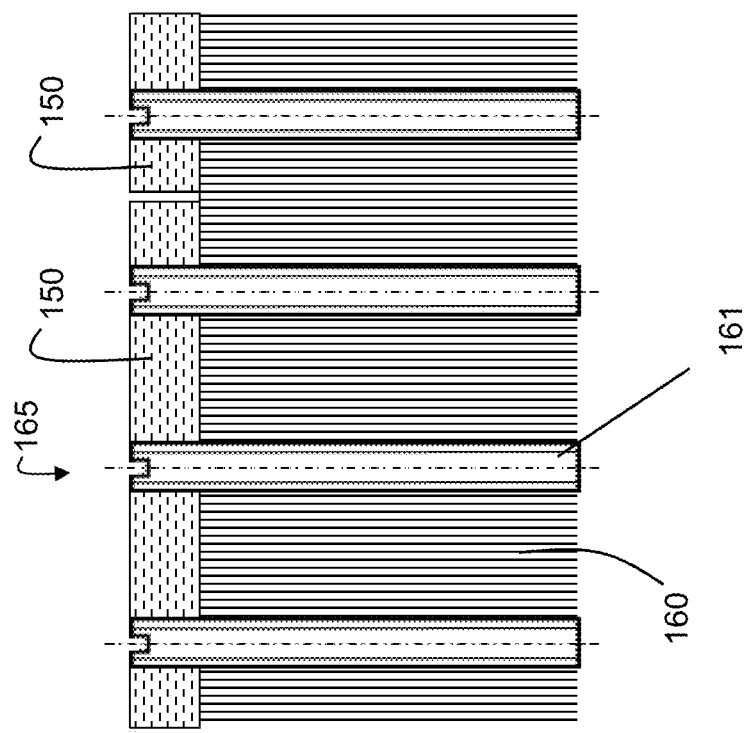

LAMINATED ROTOR BALANCING PROVISIONS

BACKGROUND OF THE INVENTION

The subject matter disclosed herein relates generally to a rotor structure of an electric machine such as a generator. More particularly, the invention relates to a laminated rotor structure for an electric machine, and a balancing member structure for the same.

Generators typically include a stator and a rotor, the rotor rotating about a longitudinal axis within the stator to convert mechanical energy into electrical energy. The stator typically includes windings from which electrical power is output.

The rotor includes axially extending slots about the circumference of the rotor body, which extend lengthwise along the rotor body. These slots contain stacked coils which form the rotor field windings for carrying current. The rotor field windings are supported in place against centrifugal forces by using one of a number of different systems including, e.g., coil wedges which bear against the slot surfaces. The regions of the coils which extend beyond the ends of the rotor body are referred to as end windings, and are retained against centrifugal forces by retaining rings. The portion of the rotor shaft forging which is located under the rotor end windings is referred to as the spindle.

Rotors may be formed from a solid single forging of high strength iron or steel, to provide the rotor with the required bending stiffness to support the rotor statically and to transmit torque from the rotor to a drive flange of the generator for successful operation of a large, high speed generator. These solid single-forging rotors are expensive to produce, and limited production capacity may result in long lead times for ordering and manufacturing.

Laminated rotor bodies have been used in some electric machines such as generators and motors to alleviate the expense and lead time associated with solid steel rotors. These laminated rotor bodies comprise laminations placed on, or attached to, a single steel shaft, such that the shaft provides the required bending stiffness for the rotor. Laminated rotor bodies have also been used in electric machines in which the stack of laminations is held in compression by a series of rods that pass through holes in the periphery of the laminations. Relative to forged rotors, laminated rotors may be more prone to deformities as a result of fault torques and radial runoff, and therefore may require more frequent and/or more extensive rebalancing throughout the lifespan of the rotor.

BRIEF DESCRIPTION OF THE INVENTION

A first aspect of the disclosure provides a rotor body comprising a plurality of axially stacked laminations, wherein each lamination thereof includes a plurality of radially extending slots arranged about a circumference, and the plurality of radially extending slots in each lamination are aligned with the plurality of radially extending slots in the other axially stacked laminations. A stud member passes longitudinally through at least one hole in the plurality of stacked laminations; and a coil stack is positioned within fewer than all of the plurality of radially extending slots.

A second aspect of the disclosure provides an electric machine comprising a rotor and a stator surrounding the rotor. The rotor includes a plurality of axially stacked laminations, wherein each lamination thereof includes a plurality of radially extending slots arranged about a circumference, and the plurality of radially extending slots in each lamination are aligned with the plurality of radially extending slots in the other axially stacked laminations. A stud member passes longitudinally through at least one hole in the plurality of stacked laminations; and a coil stack positioned within fewer than all of the plurality of radially extending slots.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIG. 5 shows a front view of a rotor body lamination according to one embodiment of the invention.

FIG. 6 shows a front view of a rotor body lamination according to one embodiment of the invention.

FIG. 7 shows a detail view of a slot in a rotor body lamination according to one embodiment of the invention.

FIG. 8 shows a cross-sectional view of a rotor body according to one embodiment of the invention.

FIG. 9 shows a cross-sectional view of a balancing member included in an empty slot in the rotor body of FIG. 8, in accordance with one embodiment of the invention.

FIG. 10 shows a cross-sectional view of a balancing load which may be included in the balancing member of FIG. 9, in accordance with one embodiment of the invention.

DETAILED DESCRIPTION OF THE INVENTION

At least one embodiment of the present invention is described below in reference to its application in connection with the operation of an electric machine. Although embodiments of the invention are illustrated relative to an electric machine in the form of a generator, it is understood that the teachings are equally applicable to other electric machines including, but not limited to, motors. Further, at least one embodiment of the present invention is described below in reference to a nominal size and including a set of nominal dimensions. However, it should be apparent to those skilled in the art that the present invention is likewise applicable to any suitable generator and/or engine. Further, it should be apparent to those skilled in the art that the present invention is likewise applicable to various scales of the nominal size and/or nominal dimensions.

Figure 1:
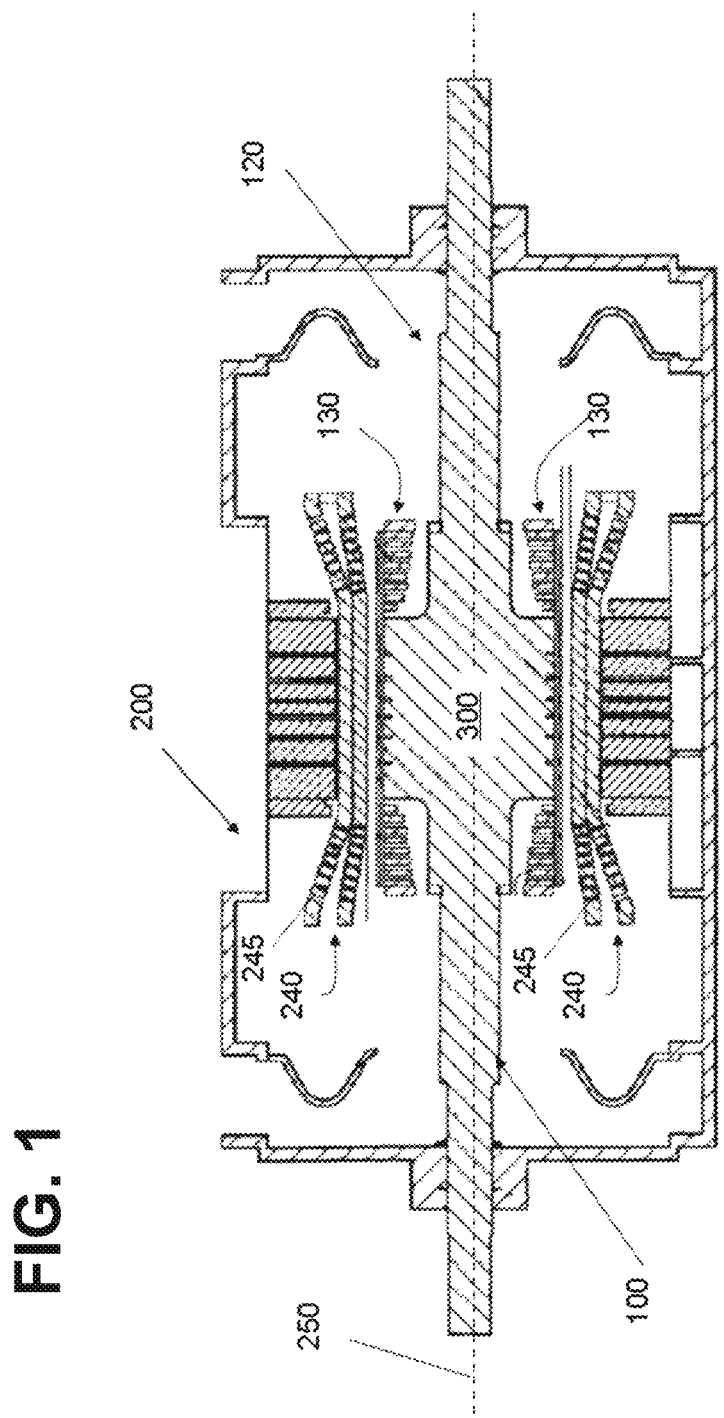
FIG. 1 shows a cross-sectional view of a generator having a rotor and a stator according to embodiments of the invention.
Figure 2:
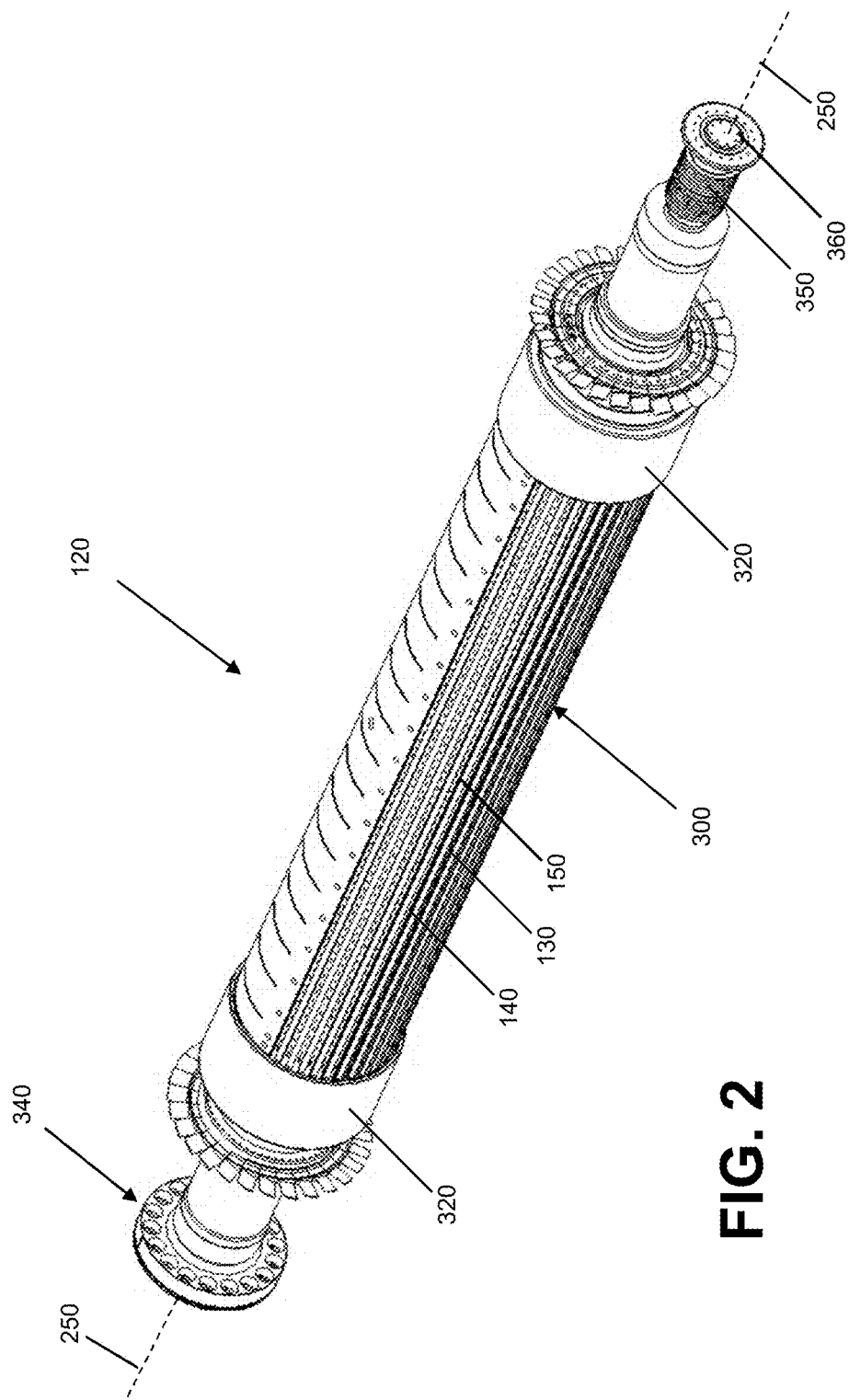
FIG. 2 shows a perspective view of a generator rotor including rotor field windings according to embodiments of the invention.

As indicated above, aspects of the invention provide a laminated rotor body and method of making the same. FIGS. 1-2 show different aspects of a generator in accordance with embodiments of the disclosure. FIG. 1 shows a cross-sectional schematic view of a generator 200, including stator 240, and rotor 120 positioned within stator 240. Stator 240 includes groups of coils 245, and may comprise any now known or later developed stator structure.

As shown in FIGS. 1-2, rotor 120 may have spindle 100 and groups of coils 130 disposed about spindle 100. Spindle 100 may be formed of, for example, iron or steel. Rotor 120 rotates about longitudinal axis 250 within stator 240. Rotor 120 further includes rotor body 300, which comprises a multi-pole magnetic core. As shown in, e.g., FIGS. 2 and 7-8, each group of coils 130 may be stacked and contained within a plurality of slots 140, and retained therein by coil wedges 150. Stacked coils 130 form the rotor field winding. Wedges 150 may be any of a variety of lengths as known in the art, and may be disposed in end-to-end relationship within each slot 140 along the axial length of rotor body 300. Coils 130 are further held in place by retaining rings 320 on each end of rotor body 300, as depicted in FIG. 2. In other embodiments, coils 130 may be held in place by carbon fiber rings or fiberglass banding (not shown), in which the uncured fiberglass banding material is wound under tension directly over rotor 120 and coils 130, and then cured.

Referring back to FIG. 2, drive coupling 340 is disposed between generator 200 and a source of mechanical energy, which may include a turbine or engine, and is configured to rotate rotor 120 with respect to stator 240. Rotation of rotor 120 results in an electrical current being created in groups of coils 245 affixed to stator 240 (FIG. 1), generating electricity. The current is then transmitted away from generator 200 for use in a variety of applications including, for example, powering homes and/or buildings.

Figure 3:
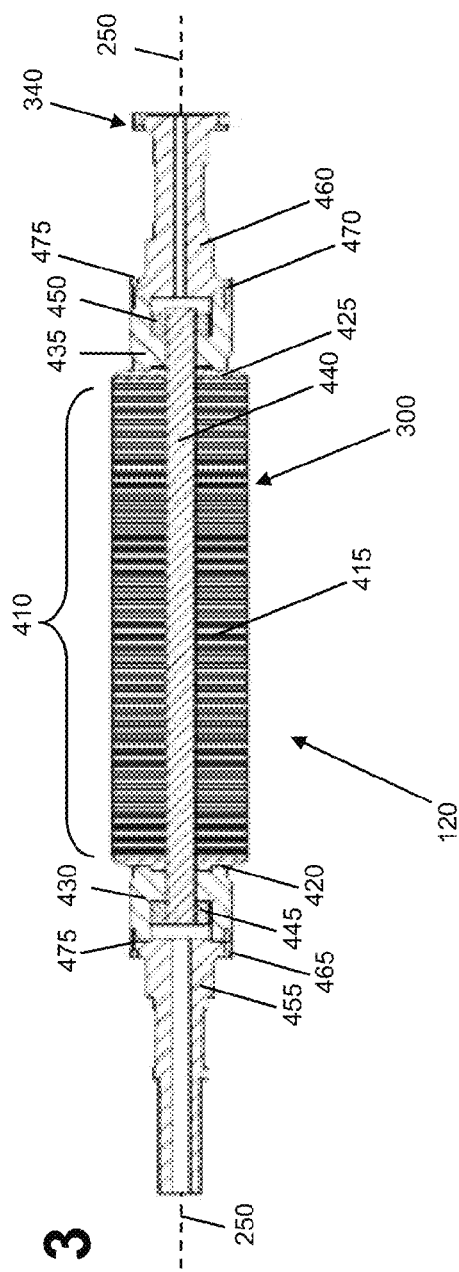
FIG. 3 shows a cross-sectional view of a generator rotor according to embodiments of the invention.
Figure 4:
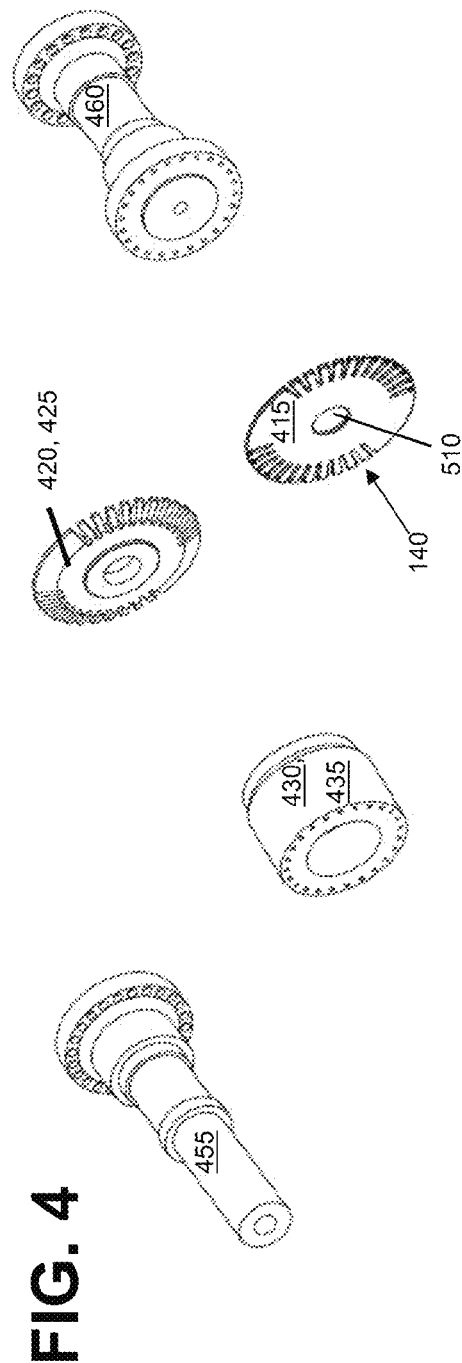
FIG. 4 shows an exploded perspective view of various parts of the generator rotor according to embodiments of the invention.

FIG. 3 shows rotor 120 according to an embodiment of the present invention, in which rotor body 300 comprises a stack 410 of a plurality of laminated plates, or laminations 415. As shown in FIGS. 4-6, each lamination 415 includes a plurality of radially extending slots 140 circumferentially arranged about at least a portion of the circumference of each lamination 415. FIG. 5 depicts an embodiment of a lamination having a slot 140 arrangement suited to a two pole synchronous generator. FIG. 6 depicts another embodiment in which lamination 415 has a slot arrangement suited to an asynchronous generator rotor having a three phase winding. Laminations 415 are disposed in stack 410 (FIG. 3) such that radially extending slots 140 in axially successive laminations 415 are aligned with one another, resulting in the axially extending slots depicted in, e.g., FIG. 2.

As shown in FIGS. 4-6, each lamination 415 further includes a hole 510 passing through the lamination. In various embodiments, the number of holes 510 may be one or greater than one. In further embodiments, laminations 415 are made of steel, and may be cut using any known method, including but not limited to machining, laser cutting, water jet cutting, or die punching. In still further embodiments, the laminations may undergo further processing to coat the surface of each lamination with an insulating coating to provide electrical isolation between adjacent laminations 415 in stack 410. One possible insulating coating may be a phosphate based inorganic coating in accordance with ASTM C-5 electrical steel insulation.

The laminations 415 depicted in FIGS. 5-7 show embodiments in which stacked rotor coils 130 are held in place within slots 140 by coil wedges 150. As shown in FIG. 8, however, fewer than all of the plurality of slots 140 may have a stack of coils 130 positioned therein. In the embodiment depicted in FIG. 8, the number of empty slots 145 that do not have coils 130 positioned therein is six, however, other embodiments may include between 3 empty slots 146 and n empty slots 145, where $n=2*m_2$, and $m_2$=a number of rotor winding phases. Regardless of the exact number of empty slots 145, in various embodiments, empty slots 145 which do not have coils 130 positioned therein may be approximately evenly spaced relative to each other empty slot 145 in laminated stack 410. For example, the six empty slots 145 depicted in FIG. 8 are each spaced approximately 60° from each other empty slot 145. In other embodiments, four empty slots 145 may be spaced approximately 90° from each other, three empty slots 145 may be spaced approximate 120°, eight empty slots 145 may be spaced approximately 45° from each other, and so on. In other embodiments, different spacings may be employed between different empty slots 145, such that not all empty slots 145 are the same distance from one another. As shown in FIG. 8, empty slots 145 may have approximately the same size and dimensions as each slot 140 containing coils 130. In other embodiments, however, empty slots 145 may have different dimensions from those of slots 140 containing coils 130.

As further shown in FIG. 8, a plurality of balance members 160 may be disposed within empty slots 145 to balance rotor 120. Balance members 160 may be substantially rod-shaped or have any other shape which may be accommodated by axial slots 145 in laminated stack 410. Further, balance members 160 may have the same or different shapes, masses, etc. as other balance members 160 disposed in other empty slots 145. A balance member 160 may be disposed in any empty slot 145, i.e., any slot that does not have coils 130 positioned therein. Each of the plurality of balance members 160 may be placed in slot 145 or removed from slot 145 in rotor 120 independently of each of the other balance members 160. Each empty slot 145 may further include a balance loads 161, the addition or removal of which may add or subtract weight from a portion of rotor 120 in order to achieve balanced rotation of rotor 120.

As shown in FIG. 8, and in greater detail in FIG. 9, described in greater detail below, wedges 150 may be disposed such that a wedge 150 occupies a radially outward end of each slot 140, 145. As discussed above, wedges 150 may be used to retain coils 130 within slots 140. Wedges 150 may further be used to retain balance members 160 in slots 145.

In FIG. 9, a cross sectional view of balance member 160 as cut by plane A-A (in FIG. 8) is shown. Balance member 160 may held in place within empty slot 145 by wedges 150, which are disposed in end-to-end axial relationship with one another within empty slot 145. Two wedges 150 are shown in the portion of the axial length of slot 145 shown in FIG. 9. Balance member 160 and wedges 150 may further include a hole or holes 165, extending radially inward from the outer diameter of rotor body 300 inward to a depth of, e.g., from about 1 cm to about 12.5 cm (about 0.4 inch to about 5 inches) in one embodiment, although deeper or shallower holes 165 are also possible.

As shown in FIGS. 9-10, each of holes 165 may contain a balance load 161, which can be cut to adjust the weight of balance load 161 in order to achieve precise rotor balance. In the embodiment shown in FIG. 9, balance load 161 is a threaded cylinder, which is removably inserted through wedge 150 and balance member 160. Other shapes of balance loads 161 may also be possible. Each balance load 161 may be inserted or removed independently of each other balance load 161 in the same and other empty slot 145. In one embodiment, a diameter of balance loads 161 may be substantially determined in accordance with a diameter of hole 165. In an embodiment, balance loads 161 may have a diameter that is set equal to about one half o the width of axial slot 140, with distances between axially adjacent balance loads 161 equal to the width of slot 140. A number of holes 165 per wedge 150 will vary significantly with the axial length of wedge 150.

Depending on the materials of which wedge 150, balancing member 160, and balancing load 161 are made, wedge 150 and/or balancing member 160 may be threaded on an inside surface of hole 165 for securing balancing load 161, which also are threaded. In some embodiments, one or both of balancing member 160 and balancing load 161 may be made of steel. Other materials are possible. Further, wedges 150 may be made of steel, or a non-metallic material. Where wedges 150 comprise a non-metallic material, it may be advantageous to located the threads on the inner surface of hole 165 in balancing member 160.

In addition to helping to achieve balanced rotation of rotor 120, balance members 160 may also carry torque from laminated stack 410 to end flange members (420, 425), a feature which may be advantageous where friction forces between laminations 415 cannot be increased.

Referring back to FIG. 3, lamination stack 410 is flanked by a first end flange member 420 located on a first end of lamination stack 410, and by a second end flange member 425 located on a second end of lamination stack 410. First and second end flange members 420 and 425 may be, but need not be, part of the magnetically active portion of rotor 120 comprising rotor body 300.

In an embodiment, lamination stack 410 and first and second end flange members 420 and 425 may further be flanked by a first spacer member 430 located adjacent to the first end flange member 420, and a second spacer member 435 located adjacent to the second end flange member 425. As shown in FIG. 4, end flange members 420, 425 and spacer members 430, 435 each further include a hole passing therethrough. In another embodiment, end flange members 420, 425 may include spacer members 430, 435, respectively, as constituent parts of the structure of the end flange members 420, 425. In such an embodiment, a separate spacer members 430, 435 may not be used. In yet another embodiment, spacer members 430, 435 and end flange members 420, 425 may each comprise a plurality of sub-components which together form the spacer member or end flange member structures as shown in FIG. 4.

Referring back to FIG. 3, stud member 440 passes through hole 510 in each of the stacked laminations 415 that comprises lamination stack 410, as well as through the holes in each of the first and second end flange members 420 and 425, and first and second spacer members 430 and 435 (if present). Stud member 440 comprises a high strength material which is able to maintain very high compression such as, for example, steel. In a further embodiment, stud member 440 may be threaded only on each of the ends of stud member 440. First fastener 445 and second fastener 450 secure each of the ends of stud member 440, and, together with stud member 440, provide compression to laminated stack 410. Fasteners 445 and 450, which may include nuts, torque nuts or torque bolts, or other threaded fasteners, may be tightened using any known means, including but not limited to: use of hydraulic tensioning equipment, heat tightening, and so on.

As shown in FIG. 4, in one embodiment, first end flange member 420 and second end flange member 425 may be shaped to provide nearly uniform pressure over an entirety of a cross section of the lamination stack 410, the first and second end flange members 420, 425 being tapered in thickness such that the outer diameter of each flange 420, 425 initially contacts the outer diameter of lamination stack 410. As the compression load increases upon tightening of fasteners 445, 450, each end flange member 420, 425 deforms so the entire face of flange 420, 425 is in contact with the entire face of the ends of the lamination stack 410.

Tightening of fasteners 445, 450 results in compression of laminated stack 410 at a pressure sufficient to provide the necessary bending stiffness to rotor body 300 and sufficient frictional capability to transmit a torque load from rotor body 300 to a drive shaft. The pressure necessary to accomplish this varies with the size of generator 200, and consequently, with the size of rotor 120. Larger machines require increased rotor stiffness, approaching that of a solid steel rotor. The pressures achieved are highly dependent on a variety of variables including but not limited to: the size of the rotor, the materials from which it is made, the extent to which fasteners 445, 450 are tightened, and so on.

As shown in FIG. 3, a non-drive end shaft spindle 455 may be affixed to first spacer member 430, and a drive end shaft spindle 460 may be affixed to the second spacer member 435. In various embodiments, spacer members 430, 435 each include a flange 465, 470 to which spindles 455, 460 may be affixed, respectively. In a further embodiment, spindles 455, 460 may be affixed to spacer members 430, 435 by a plurality of bolts 475, although any known method of fixation such as welding may also be used. In further embodiments, drive end spindle 460 includes drive coupling 340 (FIG. 2), and is configured to operably connect rotor 120 to a source of mechanical energy such as, for example, a turbine, causing rotor 120 to rotate. In certain embodiments, it may be desirable to have two sources of mechanical energy connected to rotor 120, one connected to each end of the rotor. In this case spindle 455 may also be configured to have an auxiliary drive coupling 360 (FIG. 2) operably connected to rotor 120. Non-drive end spindle 455 is configured to operably connect coils 130 with coil collector rings 350 (FIG. 2), which are disposed about spindle 455 (FIG. 3), or a brushless exciter (not shown) to provide excitation current to the rotor coils 130.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotor comprising:
   a plurality of axially stacked laminations,
     wherein each lamination thereof includes a plurality of radially extending slots arranged about a circumference, and the plurality of radially extending slots in each lamination are aligned with the plurality of radially extending slots in the other axially stacked laminations;
   a stud member passing longitudinally through at least one hole in the plurality of stacked laminations;

a coil stack positioned within fewer than all of the plurality of radially extending slots;

a balance member disposed in each radially extending slot in the plurality of radially extending slots that does not have a coil positioned therein;

a wedge disposed in each of the plurality of radially extending slots at a radially outward end thereof; and a radially inward extending hole which extends through the wedge and at least partially through the balance member.

2. The rotor of claim 1, wherein a plurality of radially extending slots do not have a coil positioned therein, and wherein the plurality of radially extending slots that do not have a coil positioned therein comprises between 3 and n empty slots, where $n=2*m_2$, and $m_2=$a number of rotor winding phases.

3. The rotor of claim 2, wherein each slot in the plurality of radially extending slots that do not have a coil positioned therein is approximately evenly spaced from each other slot in the plurality of slots that do not have a coil positioned therein.

4. The rotor of claim 1, wherein each of the plurality of balance members further comprises steel.

5. The rotor of claim 1, wherein each of the plurality of balance members is removably affixed to a body of the rotor independently of each of the other balance members.

6. The rotor of claim 1, further comprising at least one balance load removably disposed in the radially inward extending hole.

7. The rotor of claim 6, wherein each of the at least one balance loads further comprises a threaded cylinder, and wherein at least a portion of an inner surface of the radially inward extending hole is threaded.

8. The rotor of claim 7, wherein each wedge retains one of a coil and a balance member, within a slot.

9. The rotor of claim 7, wherein each wedge comprises a non-metallic material.

10. An electric machine comprising:
a rotor including:
a plurality of axially stacked laminations,
wherein each lamination thereof includes a plurality of radially extending slots arranged about a circumference, and the plurality of radially extending slots in each lamination are aligned with the plurality of radially extending slots in the other axially stacked laminations;
a stud member passing longitudinally through at least one hole in the plurality of stacked laminations;
a coil stack positioned within fewer than all of the plurality of radially extending slots;
a balance member disposed in each radially extending slot in the plurality of radially extending slots that does not have a coil positioned therein;
a wedge disposed in each of the plurality of radially extending slots at a radially outward end thereof; and
a radially inward extending hole which extends through the wedge and at least partially through the balance member; and
a stator surrounding the rotor.

11. The electric machine of claim 10, wherein a plurality of radially extending slots do not have a coil positioned therein, and wherein the plurality of radially extending slots that do not have a coil positioned therein comprises between 3 and n empty slots, where $n=2*m_2$, and $m_2=$a number of rotor winding phases.

12. The electric machine of claim 11, wherein each slot in the plurality of radially extending slots that do not have a coil positioned therein is approximately evenly spaced from each other slot in the plurality of slots that do not have a coil positioned therein.

13. The electric machine of claim 10, wherein each of the plurality of balance members further comprises steel.

14. The electric machine of claim 10, wherein each of the plurality of balance members is removably affixed to a body of the rotor independently of each of the other balance members.

15. The electric machine of claim 10, further comprising at least one balance load removably disposed in the radially inward extending hole.

16. The electric machine of claim 15, wherein each of the at least one balance loads further comprises a threaded cylinder, and wherein at least a portion of an inner surface of the radially inward extending hole is threaded.

17. The electric machine of claim 16, wherein each wedge retains one of a coil and a balance member within a slot.

18. The electric machine of claim 16, wherein each wedge comprises a non-metallic material.

19. A rotor comprising:
a plurality of axially stacked laminations,
wherein each lamination in the plurality of stacked laminations includes a plurality of radially extending slots arranged about a circumference, and the plurality of radially extending slots in each lamination are aligned with the plurality of radially extending slots in the plurality of axially stacked laminations;
a stud member passing longitudinally through at least one hole in the plurality of stacked laminations;
a coil stack positioned within fewer than all of the plurality of radially extending slots;
a balance member disposed in each radially extending slot in the plurality of radially extending slots that does not have a coil positioned therein;
a wedge disposed in each of the plurality of radially extending slots at a radially outward end thereof;
a radially inward extending hole which extends through the wedge and at least partially through the balance member; and
at least one balance load removably disposed in the radially inward extending hole.

* * * * *